T. S. MILLER.
FRICTION CLUTCH MECHANISM.
APPLICATION FILED JAN. 10, 1910.
1,024,737.
Patented Apr. 30, 1912.
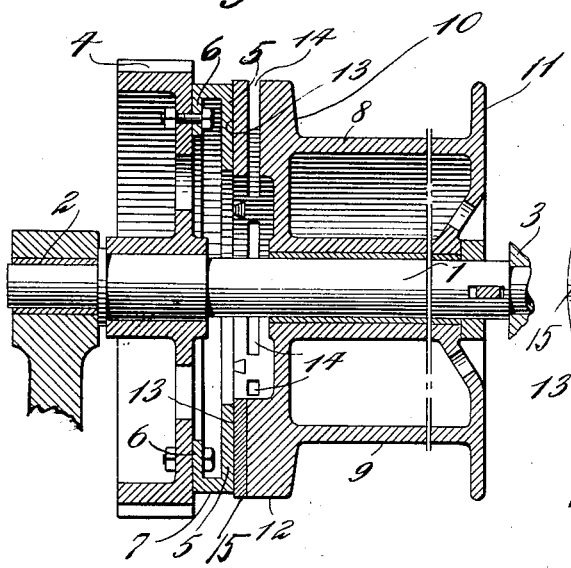
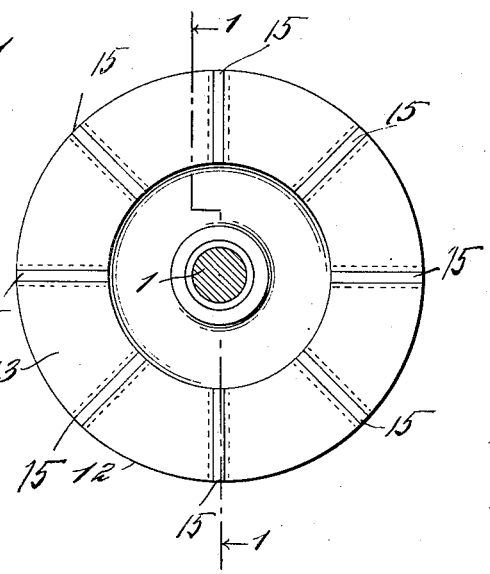
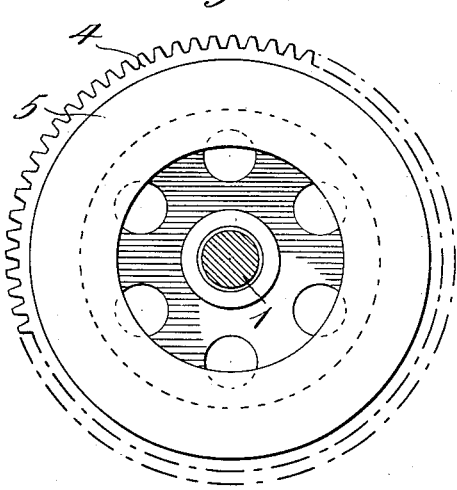
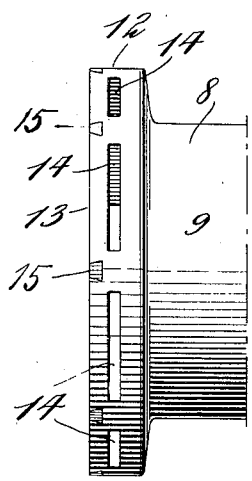

UNITED STATES PATENT OFFICE.

THOMAS SPENCER MILLER, OF SOUTH ORANGE, NEW JERSEY.

FRICTION-CLUTCH MECHANISM.

1,024,737.  Specification of Letters Patent.  Patented Apr. 30, 1912.

Application filed January 10, 1910. Serial No. 537,175.

*To all whom it may concern:*

Be it known that I, THOMAS SPENCER MILLER, a citizen of the United States, and a resident of South Orange, in the county of Essex and State of New Jersey, have invented certain new and useful Improvements in Friction-Clutch Mechanisms, of which the following is a specification.

My invention relates to new and useful improvements in friction clutch mechanisms for use in connection with hoisting engines and similar apparatus, and more particularly to that type embodying a driving element, and a rope drum mounted on a common shaft co-axial with said element and drum, said elements being provided with clutch elements which are brought into coöperation to clutch the elements together by shifting one of the elements toward the other longitudinally of the shaft.

In the usual construction of hoisting engines it has been common practice to provide a driving element and the drum with coöperating friction faces, one of which may consist of a plurality of friction blocks, while the other consists of a hard steel ring usually cast separate from the element to which it is attached, hard steel being employed for the reason that the blocks would cut or score any softer material. In the present invention I contemplate reducing expense of production by dispensing with the hard steel friction element and employing in lieu thereof a common cast steel element which can be produced at a greatly reduced cost. I also contemplate a further reduction in the cost of production by casting the friction blocks integral with the drum and of the same material as the drum which is usually hard cast iron, this being particularly desirable as it simplifies the construction over those in which the blocks were made separate and afterward attached to the drum. By this arrangement I am enabled, not only to greatly reduce the cost of production, but to increase the efficiency of the clutch mechanism beyond the point hitherto attained. In order that the turning or frictional engagement of the hard cast iron surface and the cast steel surface will not cause the latter to be scored or furrowed, I provide means for removing from the cast steel surface any inequalities which may be formed therein.

The object of the invention is, therefore, to provide a construction which can be produced at low cost, which will develop the proper degree of friction necessary to make the driving connection between the parts, and in which the engaging faces of the frictions will be maintained true and even at all times so that the proper degree of friction can always be obtained.

The invention consists in the construction of parts and arrangement in operative combination, to be fully described hereinafter and the novelty of which will be particularly pointed out and distinctly claimed.

I have fully and clearly illustrated my invention in the accompanying drawings to be taken as a part of this specification and wherein—

Figure 1 is a central longitudinal section through a hoisting engine drum and driving gear having my improved friction clutch applied thereto. Fig. 2 is a face view of the friction element on the drum. Fig. 3 is a face view of the friction element on the driving gear. Fig. 4 is a detail view in side elevation of the end of the drum which carries the friction element.

Referring to the drawings by characters of reference, 1 designates a driving shaft which may be revolubly mounted in bearings shown generally at 2, 3, formed in the frame work (not shown) upon which the parts of a hoisting engine are usually mounted. Mounted on this shaft is a driving gear 4, of any suitable type, adapted to be driven from any desired source of power. Secured to one face of this gear is a friction element preferably in the form of a ring and consisting of an annular friction surface 5, secured to a vertical face of the gear so as to be spaced apart therefrom in order that the rear face of said plane may be subjected to the cooling effects of air. The friction element may be secured in place by any suitable means but I prefer to provide the same with a securing flange 6, formed integral with said element, said flange being located in a plane parallel to the friction surface and united thereto by a circumferential web 7. This annular friction element is preferably formed of cast steel, the advantage of which will appear presently.

Arranged on the shaft 1, is a winding rope drum 8, consisting of a barrel 9, and integral end flanges 10, 11. This drum is arranged to be moved longitudinally of the shaft to throw the same into and out of position to be driven by the driving gear, any suitable shifting or thrust mechanism being employed for this purpose.

The head or end of the drum nearest the driving gear 4, is provided with an annular element 12 having a friction surface 13 to coöperate with the friction surface 5 on said gear. This annular element 12 is preferably cast integral with the head of the drum from hard cast iron, and said element is formed with a plurality of radial openings 14 extending through the said element and providing for the passage of air therethrough to act to cool the friction surface. The elements 5 and 12 are adapted to be placed in facial contact with each other to frictionally connect the driving gear and the drum, and I have found that the selection of hard cast iron for one element and cast steel for the other is particularly advantageous for the reason that there is a high degree of friction attained when these parts are brought together as there is a high coefficient of friction when cast steel is brought into contact with hard cast iron.

During the operation of the drum it will be apparent that the faces of the friction elements may move relative to each other and this might cause the hard cast iron to wear grooves or furrows in the cast steel ring, and I therefore provide means which will remove such grooves or furrows and maintain the friction face of the cast steel element always true and flat. I accomplish this result by providing the cast iron element with truing means which will cut or wear down the face of the cast steel element and remove all inequalities from the face thereof. This truing means may take a variety of embodiments but I prefer to employ tool steel inserts in the form of blades 15 cast in the face of the cast iron element, said blades extending radially across the friction face of the element. By this provision it will be seen that whenever there is a slipping movement between the friction elements, the hard tool steel truing blades will cut off or wear down any projections on the face of the cast steel element.

It will be seen that in the embodiment of the invention shown and described, I provide material of three degrees of hardness. The hard cast iron being employed in order to obtain a high degree of friction; common cast steel because of its durability, and because as against cast iron there is a high coefficient of friction, said steel being harder than the cast iron and the hard tool steel which being harder than the cast steel serves to cut down inequalities in the cast steel, should any be formed by slipping contact of the hard cast iron therewith.

I prefer that the surfaces in friction contact be flat, and in a plane at right angles to the axis of rotation, the advantage of this being that however much the bushing of the drum be worn on the driving shaft 1, the surfaces when pushed together will be in proper contact. It will also be noted that the steel ring which is in contact with the cast iron is thin and, therefore, flexible, the object of this being to insure perfect contact. If the surface of the ring 5 becomes hot due to friction, said ring may dish outwardly and form a cone, and the flexibility of this ring will permit it to be flattened by pressure when the drum friction surface is forced into contact therewith.

While I have described the invention as being particularly applied to hoisting engines, I wish it to be distinctly understood that I do not desire to be limited to such a construction or relation as the invention is applicable to any construction or situation wherein it may be desirable to employ the friction clutch. In other words, the invention is capable of general application, but I have described it in connection with a hoisting engine in view of the fact that it is in connection with a hoisting engine that I have developed it.

Having thus described my invention, what I claim is:—

1. In combination, a driving element, a driven element, friction surfaces for connecting said elements to drive the driven element, and means carried by one of said elements for truing one of the friction surfaces.

2. In combination, a driving element, a driven element, friction surfaces for connecting said elements to drive the driven element, one of said surfaces being of a material softer than the other of said surfaces, and means carried by said softer surface for truing said other surface.

3. In combination, a driving element, a driven element, a cast iron friction surface on one of said elements, a cast steel friction surface on the other of said elements, and truing devices on the element carrying the cast iron surface for truing the cast steel surface.

4. In combination, a driving element, a driven element, friction surfaces for connecting said elements to drive the driven element, and radial truing devices on one of said elements for truing the friction surface on the other of said elements.

5. In combination a driving element, a driven element, friction surfaces for connecting said elements to drive the driven element, and means carried by one of said elements in normal engagement with the friction surface on the other of said elements for truing said surface.

6. In combination a driving element, a driven element having coöperating friction surfaces for connecting said elements to drive the driven element, and radially extending blades located in the friction surface of one of said elements for truing the friction surface on the other of said elements.

7. In combination a driving element, a driven element having coöperating friction surfaces for connecting said elements to drive the driven element, and truing devices cast integral with one of said friction surfaces and normally engaging the friction surface on the other of said elements to true the latter.

8. In combination a driving element, a driven element, a cast iron friction surface on one of said elements, a cast steel friction element on the other of said elements and tool steel blades embedded in the cast iron friction surface and normally engaging the cast steel surface to true the latter.

9. In combination a driving element, a hoisting drum having a cast iron friction surface, and air passages through said surface, a cast steel friction ring carried by the driving element to coöperate with the friction surface on the drum, and tool steel inserts in the face of the cast iron surface normally engaging the cast steel surface to true the latter.

10. In combination a driving element, a driven element, friction surfaces for connecting said elements to drive the driven element, and means carried by one of said elements for truing one of the friction surfaces, said friction surfaces being flat in a plane at right angles to the axis of rotation.

11. In combination, a driving element, a driven element, friction surfaces for connecting said elements to drive the driven element, and radial truing devices on one of said elements for truing the friction surface on the other of said elements, said friction surfaces being flat in a plane at right angles to the axis of rotation.

12. In combination a driving element, a driven element having coöperating friction surfaces for connecting said elements to drive the driven element, and radially extending blades located in the friction surface of one of said elements for truing the friction surface on the other of said elements, said friction surfaces being flat in a plane at right angles to the axis of rotation.

13. In combination, a driving element, a hoisting drum having a cast iron friction surface, and air passages through said surface, a cast steel friction ring carried by the driving element to coöperate with the friction surface on the drum, and tool steel inserts in the face of the cast iron surface normally engaging the cast steel surface to true the latter.

14. In combination, a driving element, a driven element, a flexible annular friction surface on one of said elements, a friction surface on the other element and truing devices carried by one of said elements and acting on the friction surface on the other element to true the same.

15. In combination, a driving element, a driven element, a flexible annular friction surface on one of said elements spaced therefrom, a friction surface on the other of said elements, truing devices on one of said elements coöperating with the friction surface on the other element for truing the same, said friction surfaces being arranged in a plane at right angles to the axis of rotation.

16. In combination, a driving element, a driven element, friction surfaces for connecting said elements to drive the driven element, and a truing blade carried by one of said elements and extending across the face of the friction surface of the other element for truing said last-named friction surface.

17. In combination, a driving element, a driven element, friction surfaces for connecting said elements to drive the driven element, and truing means carried by one of said elements and extending across the face of the friction surface of the other element for truing said last named friction surface.

In testimony whereof I have hereunto signed my name in the presence of two subscribing witnesses.

THOMAS SPENCER MILLER.

Witnesses:
ERNEST PULSFORD,
HARRY J. F. SMITH.